United States Patent [19]
Okawa

[11] Patent Number: 5,729,282
[45] Date of Patent: Mar. 17, 1998

[54] VIDEO CAMERA SYSTEM

[75] Inventor: Hiroshi Okawa, Kanagawa, Japan

[73] Assignee: Sony Corporation, Tokyo, Japan

[21] Appl. No.: 571,353

[22] Filed: Dec. 13, 1995

[30] Foreign Application Priority Data

Dec. 19, 1994 [JP] Japan ................. 6-314632

[51] Int. Cl.⁶ .................. H04N 7/14; H04N 5/225
[52] U.S. Cl. .................. 348/13; 348/222; 348/423; 348/17
[58] Field of Search ................. 348/12, 13, 14, 348/15, 17, 423, 500, 469, 466, 845–845.3, 207, 222

[56] References Cited

U.S. PATENT DOCUMENTS

| | | | |
|---|---|---|---|
| 5,365,265 | 11/1994 | Shibata et al. | 348/17 |
| 5,367,331 | 11/1994 | Secher et al. | 348/17 |
| 5,473,366 | 12/1995 | Imada et al. | 348/17 |
| 5,543,937 | 8/1996 | Hamai et al. | 348/423 |
| 5,565,924 | 10/1996 | Haskell et al. | 348/423 |
| 5,594,550 | 1/1997 | Juri et al. | 348/423 |
| 5,638,114 | 6/1997 | Hatanaka et al. | 348/15 |

*Primary Examiner*—Victor R. Kostak
*Attorney, Agent, or Firm*—William S. Frommer; Alvin Sinderbrand

[57] ABSTRACT

A digital video communication system for bidirectional communication between a first station and a second station is disclosed. The first station, which may be a camera head unit, includes a first transmitting portion and a first receiving portion. The first transmitting portion has a video data processing unit supplied with video data and adapted for outputting processed video data at a variable transmission bit rate controlled by a first rate controlling signal, and a first multiplexing unit for multiplexing audio data and an error detection signal on the processed video data. The first receiving portion has a separating unit for separating video data, a control signal and audio data from received multiplexed data, a generating unit for generating the rate control signal from the control signal and a unit for supplying the rate signal to the video data processing unit. The second station, which may be a camera control unit, includes a second receiving portion and a second transmitting portion, with the second receiving portion having a separating unit for separating the video data, the audio data and the error detecting signal from the multiplexed data and error detecting means supplied with the error detecting signal for detecting the error rate and generating error rate detecting signal. The second transmitting portion has a control signal generating unit supplied with the error rate detecting signal and adapted for generating the control signal, and a second multiplexing unit for multiplexing the video data, audio data and the control signal.

6 Claims, 2 Drawing Sheets

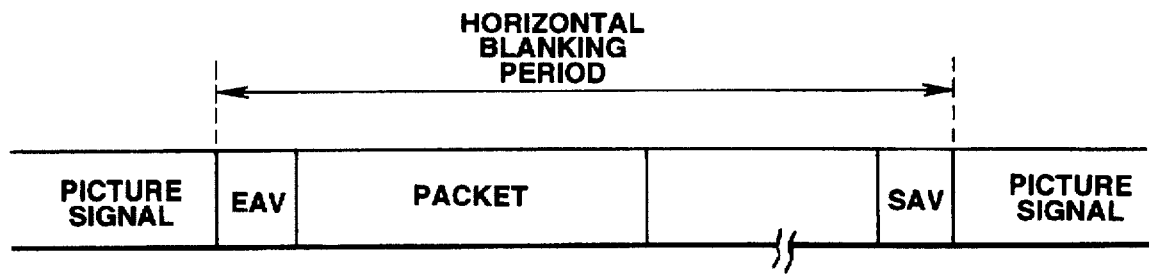
FIG.2
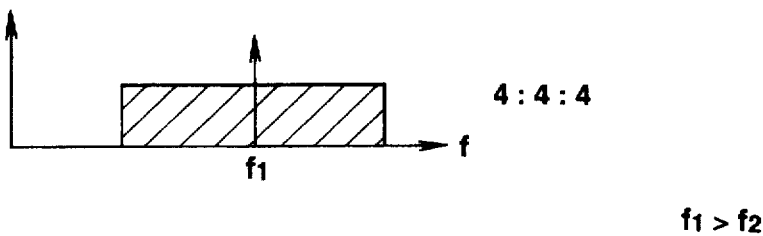
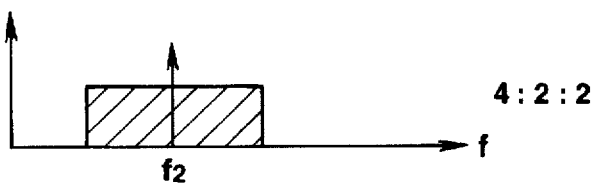

VIDEO CAMERA SYSTEM

BACKGROUND OF THE INVENTION

This invention relates to a video camera system and, more particularly, to a video camera system which permits bidirectional communication between a camera head and a camera control unit by a digital transmission system.

Nowadays, a video camera system comprised of a camera head unit, configured for forming picture signals based upon picture signals generated by an imaging element and for processing speech signals, and a camera control unit configured for processing signals supplied from the camera head unit, with the camera head unit and the camera control unit being interconnected for enabling bidirectional communication with each other, has come into widespread use.

Up to now, data transfer between the camera head unit and the camera control unit of the video camera system is by analog transmission. Thus a problem has been raised that the communication signals be deteriorated in quality with increasing length of the transmission route.

On the other hand, it is required of the video camera system by analog transmission that a variety of peripheral equipments be connected to the camera head unit or the camera control unit fop enabling communication between the peripheral equipments on one hand and the camera head unit and the camera control unit on the other hand. Such system suffers from a problem that it is difficult to increase the amount of transmission of the communication signals.

Recently, with a view to prohibiting deterioration of communication signals and increasing the amount of transmission, investigations towards digitalization of the transmission between the camera head unit and the camera control unit are proceeding.

With analog transmission, deterioration of the analog communication signals and hence the picture quality becomes significant with increasing length of the transmission channel. However, picture reproduction is possible up to a detection limit of the communication signals.

In the case of digital transmission, since the digital communication signals deteriorated on the transmission channel are corrected for errors and subsequently reproduced by the reception unit, deterioration of the digital communication signals becomes outstanding with increasing length of the transmission channel. However, if the deterioration of the digital communication signals is within the range of the ability of error correction, the digital communication signals are reproduced with error correction to prohibit picture deterioration. Conversely, if the deterioration of the digital communication signals is outside the range of the ability of error correction, error correction cannot be made, but bit errors are produced in the playback picture. This acutely deteriorates the picture quality, such that the reproduced picture cannot be recognized sufficiently.

OBJECT AND SUMMARY OF THE INVENTION

It is therefore an object of the present invention to provide a video camera system capable of sufficiently reproducing communication signals over a transmission channel of a prolonged distance.

According to the present invention, there is provided a video camera system capable of bidirectional digital communication between a camera head unit and a camera control unit. The camera head unit includes a head transmission unit, the transmission bit rate of which my be variably set based upon the rate setting signal and which is configured for multiplexing speech signals, error detection signals or error correction signals to be appended to picture signals for transmitting the resulting signal to the camera control unit. The camera head unit also includes a head reception unit for separating the picture signals received by the camera control unit and the rate setting signal or speech signals multiplexed on the picture signals, and rate setting means for setting the rate setting signal separated from the head reception unit in the head transmitting unit. The camera control unit includes a control reception unit for separating the picture signals received from the camera head unit and the error detection signals, error correction signals and speech signals multiplexed on the picture signals, rate setting signal generating means for detecting an error rate of error detection signals separated from the control reception unit and for generating a rate setting signal for lowering the transmission bit rate responsive to increase in error rate, and a control transmission unit for multiplexing the rate setting signal and the speech signal generated by the rate setting signal on the picture signal for transmitting the resulting signal to the camera head unit.

The head transmitting unit is configured for variably setting the amount of error correction codes appended to the picture signals and the transmission bit rate based upon the rate setting signals. The rate setting signal generating means generates a rate setting signal which is responsive to the increasing error rate to lower the transmission hit rate and to increase the amount of appendage of the error correction codes.

The head transmitting unit is configured for variably setting the amount of error correction codes appended to the picture signals and the transmission bit rate based upon the rate setting signals. The rate setting signal generating means generates a rate setting signal which is responsive to the increasing error rate to lower the transmission bit rate and the carrier frequency.

With the above-described configuration of the video camera system according to the present invention, the camera head unit multiplexes error detection signals on picture signals and transmits the multiplexed signal via a transmission channel to the camera control unit which then generates the rate setting signal for lowering the transmission bit rate responsive to the increasing error rate in the error detection signal. This rate setting signal is multiplexed by the camera control unit on the picture signals and transmitted from the camera control unit to the camera head unit for variably setting the transmission bit rate of the camera head unit.

The camera head unit multiplexes the error detection signal on the picture signal and routes the multiplexed signal via a transmission route to the camera control unit which then generates the rate setting signal which is responsive to the increasing error rate in the error detection signal for lowering the transmission bit rate and for increasing the amount of appendage of the error correction codes. The camera control unit multiplexes the rate setting signal on the picture signals and transmits the multiplexed signal to the camera head unit for variably setting the carrier frequency and the transmission bit rate of the camera head unit.

In sum, with the video camera system according to the present invention, the camera head unit multiplexes the error detection signal on the picture signal and transmits the multiplexed signal via a transmission route to the camera control unit which then generates the rate setting signal for lowering the transmission bit rate responsive to the increasing error rate in the error detection signal. The camera control unit multiplexes the rate setting signal on the picture signals and transmits the multiplexed signal to the camera head unit for variably setting the transmission bit rate of the camera head unit.

Thus there is provided a video camera system in which, should the communication signal be deteriorated on the transmission route, the transmission bit rate is lowered for decreasing the information density of the communication signal for facilitating demodulation of information signals for improving reproducibility of the communication signals, thereby enabling satisfactory regeneration of the communication signals despite the increased length of the transmission route.

On the other hand, the camera head unit multiplexes the error detection signals on the picture signals for transmitting the picture signals to the camera control unit on the transmission route. The camera control unit generates the rate setting signal which is responsive to the increasing error rate of the error detection signal for lowering the transmission bit rate and for increasing the amount of appendage of the error correction codes. The camera control unit multiplexes the rate setting signal on the picture signal and transmits the resulting signal to the camera head unit for variably setting the amount of appendage of the error correction codes and the transmission bit rate of the camera head unit.

Thus there is provided a video camera system in which, should the communication signal be deteriorated on the transmission route, the transmission bit rate is lowered for decreasing the information quantity of the communication signal for increasing the amount of the error correction codes appended to the communication signals for improving the error correction rate of the communication signals, thereby enabling satisfactory regeneration of the communication signals despite increased length of the transmission route.

In addition, the camera head unit multiplexes the error detection signals on the picture signals for transmitting the picture signals to the camera control unit on the transmission route. The camera control unit generates the rate setting signal which is responsive to the increasing error rate of the error detection signal for lowering the transmission bit rate and for lowering the carrier frequency. The camera control unit multiplexes the rate setting signal on the picture signal and transmits the resulting signal to the camera head unit for variably setting the carrier frequency and the transmission bit rate of the camera head unit.

Thus there is provided a video camera system in which, should the communication signal be deteriorated on the transmission route, the transmission bit rate is lowered for decreasing the information quantity of the communication signal for lowering the band of transmission and the carrier frequency for improving the S/N ratio of the communication signals in order to enable satisfactory regeneration of the communication signals despite increased length of the transmission route.

BRIEF DESCRIPTION OF THE DRAWINGS

FIG. 2 is a schematic view showing the construction of a packet multiplexed on a blanking area of picture signals by the video camera system of FIG. 1.

FIGS. 3A and 3B are graphs showing the transmission bands for the video camera system for the 4:4:4 mode and 4:2:2 mode, respectively.

DESCRIPTION OF THE PREFERRED EMBODIMENTS

Figure 1:
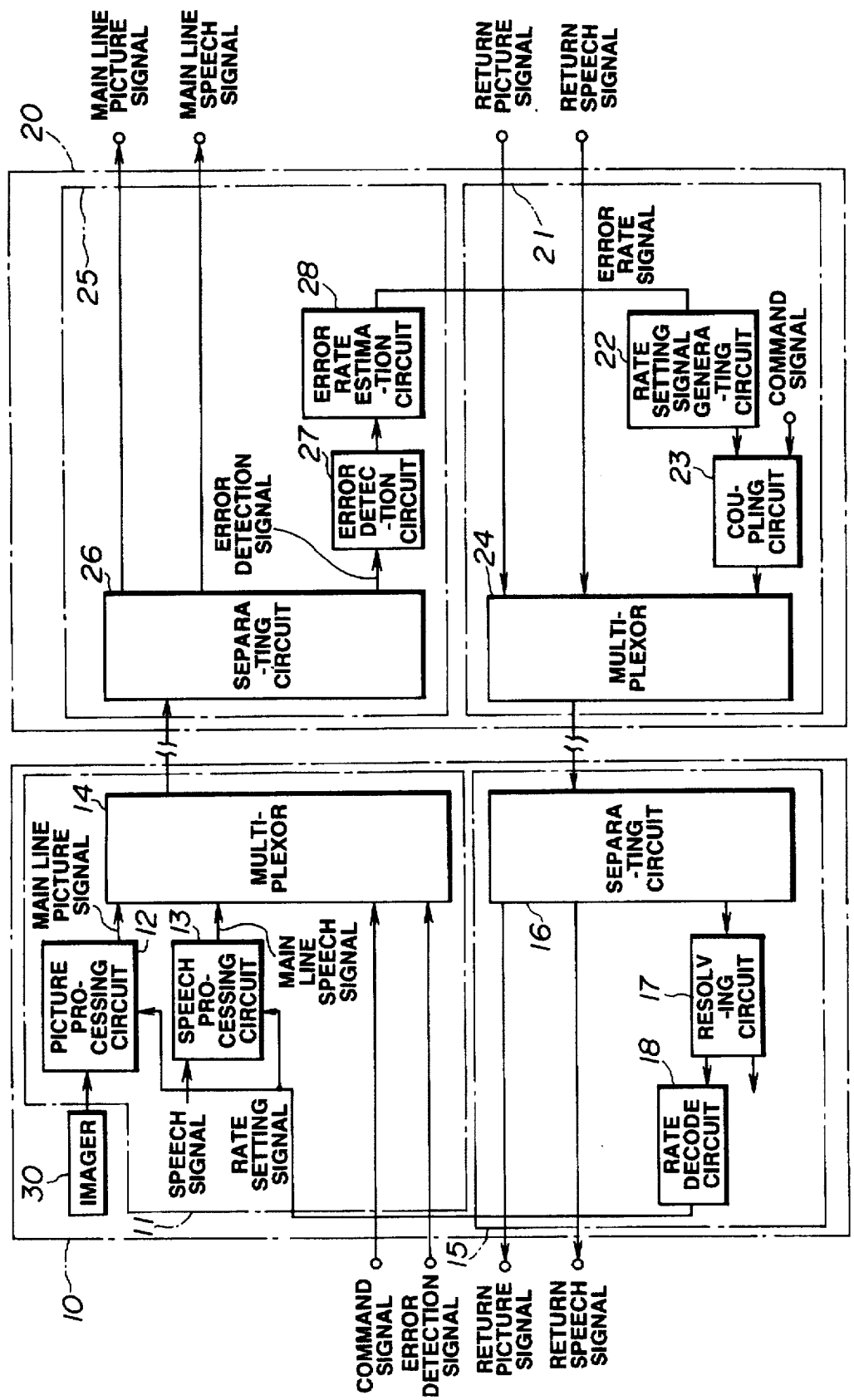
FIG. 1 is a block diagram showing essential portions of a video camera system according to the present invention.

Referring to the drawings, preferred embodiments of a video camera system according to the present invention will be explained in detail.

The video camera system according to the present invention includes a camera head unit capable of bidirectional digital communication and a camera control unit 20, as shown in FIG. 1.

The camera head unit 10 has an imaging unit 30 for imaging an object for generating imaging signals, a head communication unit 11 for generating picture signals from imaging signals supplied from the imaging unit 30 for transmitting the generated picture signals and a head reception unit 15 for receiving picture signals from the camera control unit 20, as shown in FIG. 1.

The imaging unit 80 has imaging elements, such as a CCD imager sensor or an imaging tube, for photo-electrically converting red (R), green (G) and blue (B) imaging light rays incident thereon from an object for generating R, G and B imaging signals.

The head transmission unit 11 includes a picture processing circuit 12 supplied with the R, G and B imaging signals from the imaging unit 30 and with a rate setting signals from the head reception unit 15, a speech processing circuit 13 supplied with speech signals and with the rate setting signals from the head reception unit 15 and a multiplexing circuit 14 for forming a packet of the speech signal, command signals and error detection signals and time-divisionally multiplexing the packet, as shown in FIG. 1.

The above-mentioned packet is formed during a blanking period beginning from an end point of picture signals for a scanning line (EAV signal) up to a start point of the next picture signal (SAV signal), as shown in FIG. 2.

The picture processing circuit 12 generates main-line picture signals, made up of a luminance signal Y (Y=0.3R +0.59G) +0.11B) and the color difference signals R-Y and B-Y, from the R, G and B imaging signals, and is responsive to the rate setting signal supplied from the head reception unit 15 to variably set the amount of appendage of error correction signals, such as CRC codes, transmission bit rate or the carrier frequency, to be appended to the main line picture signal.

The transmission bit rate for the main line picture signal is variably set by switching between the 4:4:4 mode and the 4:2:2 mode responsive to e.g., the rate setting signal. With the 4:4:4 mode, the ratio of the information amounts of the luminance signal Y, color difference signal R-Y and the color difference signal B-Y is set to 4:4:4, based upon the R, G ad B imaging signals, with the transmission bit rate of the luminance signal Y and the color difference signals R-Y and B-Y being 13.5M samples per second. On the other hand, with the 4:2:2 mode, the color difference signals R-Y and B-Y are formed based upon the R, G and B imaging signals which are freed of high frequency components in which visually crucial low-frequency components are maintained so that the color information amounts will be one-half and the ratio of the information amounts of the luminance signal Y, color difference signal R-Y and the color difference signal B-Y is set to 4:4:4, with the transmission bit rate of the luminance signal Y being 13.5M samples per second and that of the color difference signals R-Y and B-Y being 6.75M samples per second.

The rate setting signal is formed by switching from the 4:4:4 mode to the 4:2:2 mode when the error rate of error correction signals supplied from the camera head 10 to the cameral control unit 20 is increased. The information amount of the color difference signals R-Y, B-Y becomes equal to one-half by this switching from the 4:4:4 mode to the 4:2:2 mode.

Thus, with the number of bits per sample being e.g., 10 bits, the difference between the transmission bit rate during the 4:4:4 mode of 405 Mbps and that during the 4:2:2 mode of 270 Mbps, or 135 Mbps, are appended as an increased amount of the error correction codes to the main line picture signals, for increasing the error correction rate of the main line picture signals in the camera control unit 20 for improving reproducibility of the main line picture signals.

Alternatively, the information amounts of the color difference signals R-Y, B-Y are halved by switching from the 4:4:4 mode to the 4:2:2 mode for decreasing the required transmission band. Then, the carrier frequency f1 for the 4:4:4 mode is switched to the carrier frequency f2 for the low range side for the 4:2:2 mode, as shown in FIGS. 3A and 3B. Since in general the amount of signal attenuation (dB) on a transmission route, such as the coaxial cable, is proportionate to one-half the frequency, the amount of signal attenuation of the main line picture signal on the transmission route may be decreased by setting the carrier frequency to a low frequency for increasing the S/N ratio of the main line picture signals on the camera control unit 20 for improving reproducibility of the main line picture signals.

The speech processing circuit 13 is responsive to the speech signals, such as microphone data accousto-electrically converted from the speech by a microphone or incoming data generated by peripheral equipment, to generate main-line speech signals. The speech processing circuit is also responsive to the switching between the 4:4:4 mode and the 4:2:2 mode based upon the rate setting signal for variably setting the carrier frequency and the transmission bit rate of the main line picture signals.

The multiplexing circuit 14 is fed from the picture processing circuit 12 and the speech processing circuit 13 with main line speech signals and main line picture signals, whose transmission bit rate, amount of error correction codes and carrier frequency have been variably set responsive to the switching from the 4:4:4 mode to the 4:2:2 mode based upon the rate setting signal. The multiplexing circuit 14 appends the error correction codes to the main line picture signals, while compressing the main line speech signal on the time axis, for generating a packet made up of the compressed speech signals, command signals and error detection signals. The multiplexing circuit 14 then time-divisionally multiplexes the resulting packet in a blanking area of the main line picture signals, to which the error correction codes have been appended as described above, and routes the resulting signal to the camera control unit 20.

The above-described head transmission unit 11 increases the amount of appendage of the error correction codes to be appended to the main line picture signals and decreases the carrier frequency at the time of switching from the 4:4:4 mode to the 4:2:2 mode. The head transmission unit 111 also transmits the error correction signals, time-divisionally multiplexed on the main line picture signals, to the camera control unit 20 over the transmission route.

The head reception unit 15 includes a separating circuit 16 for separating the return picture signal, on which the packet has been time-divisionally multiplexed and supplied in this state from the camera control unit 20, a resolving circuit 17 for resolving the signal supplied from the separating circuit 16 and a rate decoding circuit 18 for decoding the signal supplied from the resolving circuit 17, as shown in FIG. 1.

The separating circuit 16 separates the packet from the return picture signal supplied from the camera control unit 20, and separates the separated packet into return speech, command signals and the rate setting signal to which are appended error correction codes. The separating circuit 16 expands the return speech along the time axis, and resolves the return signal, expanded along the time axis, into PCM data and oncoming data, while transmitting the command signals and the rate setting signals, to which the error correction codes have been appended as described above, to the resolving circuit 17.

The resolving circuit 17 resolves the supplied signals into the command signals and the rate setting signals to which the error correction codes have been appended, and resolves the resolved command signals into inner command data and outer command data, while transmitting the rate setting signals, to which the error correction codes have been appended, to the rate decoding circuit 18.

The rate decoding circuit 18 is fed with the rate setting signal to which the error correction codes have been appended, and corrects the rate setting signal with the error correction codes, while transmitting the corrected error setting signal to the head transmitting unit 11.

The resolving circuit 17 and the rate decoding circuit 18, fed from the resolving circuit 16 with the command signal and the rate setting signal, to which the error correction codes have been appended, and resolving the rate setting signal, to which the error correction codes have been appended, from the command signals, while correcting the error setting signals with the error correction codes and transmitting the corrected rate setting signals to the head transmitting unit 11, make up rate setting means.

The head receiving unit 15 is fed from the camera control unit 20 with rate setting signals derived from the error rate of the error detection signals packeted by the head transmitting unit 11 and transmitted in this state to the camera control unit 20. The head receiving unit 15 corrects the rate setting signal supplied to the rate decoding circuit 18, using the error correction codes, appended to the rate setting signal, and transmits the corrected Fate setting signal to the head transmitting unit 11.

The camera control unit 20 includes a control transmitting unit 21, transmitting picture signals to the camera head unit 10, and a control receiving unit 25, receiving the picture signal from the camera head unit 10, as shown in FIG. 1.

The control receiving unit 21 includes a rate setting signal generating circuit 22, fed from the control receiving unit 25 with the error rate signal for generating an error setting signal in meeting with the error rate and for appending error correction codes to the error setting signal, a coupling circuit 23 for coupling the rate setting signal, to which the error correction codes have been appended, to the command signals, and a multiplexing circuit 24, as shown in FIG. 1. The multiplexing circuit 24 compresses return speech signals, such as oncoming data supplied from peripheral equipments, or PCM data processed from the main line speech signals, along the time axis, and forms a packet of the compressed return speech signal, rate setting signal and the command signal, while multiplexing the packet in the blanking area of the return picture signal.

The control transmitting unit 21 is fed from the camera head unit 10 with an error rate signal, representing an error rate of the error detection signal supplied from the camera head unit 10 to the control reception unit 25. The rate setting signal generating circuit 22 generates the transmission bit rate of the head transmission unit 11 of the camera head unit 10, the amount of appendage of the error correction codes to the main line picture signal and the rate setting signal for setting the carrier frequency, based upon the error rate signal of the error detection signal supplied from the camera head unit 10 to the control reception unit 25, for appending the error correction codes to the rate setting signal. Thus, even if the communication signal is deteriorated significantly, it may be corrected for errors by the camera head unit, so that the rate setting signal may be correctly supplied from the multiplexing circuit 24 to the camera head unit 10.

The control reception unit 25 includes a separating circuit 26 for separating the packet from the main line picture signals supplied from the camera head unit 10, separating the main line speech signals and the error detection signals form the packet for expanding the main line speech signals along the time axis, an error detection circuit 27 for detecting the error detection signals, and an error rate estimating circuit 28, as shown in FIG. 1. The error rate estimating circuit 28 estimates the error rate of the error signals detected by the error detection circuit 27 and generates an error rate estimating signal based upon the estimation for transmitting the error rate signal to the control transmitting unit 21.

The control reception unit 26 is fed with the packeted error detection signal, packeted by the camera head unit 10, and generates the error rate signal based upon the error rate of the error detection signal for transmitting the generated error rate signal to the control transmitting unit 21. The control reception unit 26 also resolves the main line speech signal into microphone data and incoming data while resolving the command signals into inner command data and other command data.

The error detection circuit 27, error rate estimating circuit 28 and the rate setting signal generating circuit supplied with the error detection signal separated by the separating circuit 26 for estimating an error rate of the communication signal on the transmission route from the error rate of the error detection signal and for generating the rate setting signal responsive to the error rate, make up rate setting signal generating means.

With the above-described constitution of the video camera system, the error detection signals multiplexed on the main line picture signal are transmitted from the camera head unit 10 to the camera control unit 20 for estimating the error rate of the error detection signal for estimating the deterioration of the communication signal on the transmission route. If the error rate exceeds a preset value, the carrier frequency and the transmission bit rate from the camera control unit 20 to the camera head unit 10 are commanded to be lowered, while the amount of appendage of the error correction codes to the main line picture signals are commanded to be increased.

Thus, with the above-described video camera system, if the deterioration of the communication signals in the transmission route is incurred, the transmission rate is lowered fop lowering the information density on the transmission route for facilitating the demodulation of the information signals and improving reproducibility of the communication signals. On the other hand, the transmission bit rate may be lowered for decreasing the information amount of the communication signals for improving the error correction rate of the communication signals for improving reroducibility of the communication signals. In addition, the transmission bit rate may be lowered for decreasing the information amount of the communication signals for lowering the band of transmission and the carrier frequency for improving the S/N ratio of the communication signals and reproducibility of the communication signals.

Although the foregoing description has been made with reference to the case of switching from the 4:4:4 mode to the 4:2:2 mode on the occasion of deterioration of the error correction signal on the transmission route, the video camera system of the present invention is not limited to such switching. That is, the present invention may be applied to the case of variably setting the transmission bit rate or the carrier frequency depending upon the degree of deterioration of the error detection signals, or to the case of switching from the 4:2:2 mode to a 4:1:1 mode in which the information amount of the color difference signals R-Y and B-Y of the 4:2:2 mode is reduced to one half and the transmission bit rate is lowered responsive to data compression.

On the other hand, although the foregoing description has been made with reference to the case of variably setting the transmission bit rate and the amount of appendage of the error correction codes or the transmission bit rate and the carrier frequency responsive to the rate setting signal, the present invention is not limited to this type of the video camera system. For example, the present invention may be applied to the case in which a pre-set amount of the information of the vacant information quantity produced on lowering the transmission bit rate is the amount of appendage of the error correction codes to the picture signals, thereby decreasing the band of transmission in an amount corresponding to the amount of the remaining vacant information for lowering the carrier frequency for variably setting the transmission bit rate, amount of appendage of the error correction codes to be appended to the picture signals and the carrier frequency responsive to the rate setting signal. Alternatively, the present invention may also be applied to the case of variably setting the carrier frequency responsive to the rate setting signal.

What is claimed is:

1. A digital video communication system for bidirectional communication between a first station and a second station, said first station including a first transmitting portion and a first receiving portion, said first transmitting portion having video data processing means supplied with video data and adapted for outputting processed video data at a variable transmission bit rate controlled by a first rate controlling signal, and first multiplexing means for multiplexing audio data and an error detection signal besides said processed video data, said first receiving portion having separating means for separating video data, a control signal and audio data from received multiplexed data, generating means for generating said rate control signal from said control signal and means for supplying said rate signal to said video data processing means, said second station including a second receiving portion and a second transmitting portion, said second receiving portion having separating means for separating the video data, the audio data and the error detecting signal from said multiplexed data and error detecting means supplied with said error detecting signal for detecting the error rate and generating error rate detecting signal, said second transmitting portion having control signal generating means supplied with said error rate detecting signal and for generating said control signal and second multiplexing means for multiplexing the video data, audio data and said control signal.

2. The digital communication system as claimed in claim 1 wherein said first station is a camera head unit and said second station is a camera control unit.

3. The digital communication system as claimed in claim 2 wherein said video data processing means includes error correction code generating means for generating error correction codes from said video data and appending means for appending error correction codes to said video data, said second receiving portion including error correction means for correcting errors in the received video data by said error correction codes.

4. The digital communication system as claimed in claim 3 wherein said control signal controls said video data processing means so that the transmitting bit rate is reduced and the amount of the error correction codes is increased when said error data detection signal indicates that the error rate is increased.

5. The digital communication system as claimed in claim 1 wherein each of said first and second multiplexing means includes a time divisional multiplexer for inserting at least said audio data into a blanking interval of said video data.

6. The digital communication system as claimed in claim 1 wherein said control signal generating means includes error correction code generating means for generating an error correction code from said control signal and appending means for appending said error correction codes to said control signal.

* * * * *